(12) United States Patent
Bartko (10) Patent No.: US 10,278,149 B2
(45) Date of Patent: Apr. 30, 2019

(54) MEASURING DEVICE AND MEASURING METHOD FOR SYSTEMATIC ERROR DETECTION

(71) Applicant: Rohde & Schwarz GmbH & Co. KG, Munich (DE)

(72) Inventor: Hendrik Bartko, Unterhaching (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 345 days.

(21) Appl. No.: 15/246,482

(22) Filed: Aug. 24, 2016

(65) Prior Publication Data

US 2017/0094626 A1 Mar. 30, 2017

(30) Foreign Application Priority Data

Sep. 24, 2015 (EP) ..................................... 15186670

(51) Int. Cl.
| | |
|---|---|
| *H04W 56/00* | (2009.01) |
| *H04W 24/10* | (2009.01) |
| *H04W 72/04* | (2009.01) |
| *H04W 72/08* | (2009.01) |
| *G01S 3/02* | (2006.01) |
| *H04L 5/00* | (2006.01) |

(52) U.S. Cl.
CPC ......... *H04W 56/0035* (2013.01); *G01S 3/023* (2013.01); *H04W 24/10* (2013.01); *H04W 72/04* (2013.01); *H04W 72/082* (2013.01); *H04L 5/005* (2013.01)

(58) Field of Classification Search
CPC . H04W 56/0035; H04W 24/10; H04W 72/04; H04W 72/082; G01S 3/023; H04L 5/005

USPC .......................................................... 370/329
See application file for complete search history.

(56) References Cited

U.S. PATENT DOCUMENTS

| | | | |
|---|---|---|---|
| 5,457,466 A | 10/1995 | Rose | |
| 5,526,001 A | 6/1996 | Rose et al. | |
| 2003/0072445 A1* | 4/2003 | Kuhlman | H04L 1/0001 380/42 |
| 2008/0165839 A1* | 7/2008 | Landau | H04B 7/0417 375/227 |
| 2011/0133987 A1* | 6/2011 | Bernsten | H04B 7/086 342/417 |
| 2016/0241319 A1* | 8/2016 | Kim | H01Q 1/241 |

FOREIGN PATENT DOCUMENTS

WO WO2014135196 A1 9/2014

\* cited by examiner

*Primary Examiner* — Chi Tang P Cheng
(74) *Attorney, Agent, or Firm* — Potomac Technology Law, LLC (57) ABSTRACT

A measuring device comprises a processing unit, a first antenna adapted to receive a first signal, and a second antenna, adapted to receive a second signal. The processing unit comprises a baseline unit adapted to determine a baseline variance of a first variable and/or a second variable. Moreover, it comprises a variance unit adapted to determine a variance of the first variable and/or the second variable. The first variable and the second variable are each at least initially derived from at least the first signal and the second signal. The processing unit furthermore comprises an error unit, adapted to determine if a systematic error is present, based on the baseline variance and the variance of the first variable and/or the second variable.

11 Claims, 7 Drawing Sheets

MEASURING DEVICE AND MEASURING METHOD FOR SYSTEMATIC ERROR DETECTION

RELATED APPLICATIONS

This application claims the benefit of the earlier filing date under 35 U.S.C. § 120 of European Patent Application No. EP15186670.4 (filed on Sep. 24, 2015), the entirety of which is incorporated by reference herein.

FIELD

The present invention relates to determining systematic errors in measuring signals of at least two antennas, such as in direction finding applications.

BACKGROUND

When determining the direction of the origin of signals, in the ideal case, the signal travels directly from the signal source to the measuring device determining the direction of the signal origin. This ideal case, though, cannot always be met in practice. In practice, multi-path propagation and other effects, which lead to systematic errors, can occur. This negatively effects the determining of the direction of the signal origin. Significant errors in the determined direction of the origin can result from the above-described effects.

The international patent application WO 2014135196 A1 shows a measuring device and method for such signal direction determinations. This measuring device and method are, however, affected by the above-mentioned problems.

What is needed, therefore, is an approach for a measuring device and measuring method for detecting systematic errors in measuring signals, such as errors that adversely affect the determination of the direction of the origin of a signal.

SOME EXAMPLE EMBODIMENTS

Embodiments of the present invention advantageously address the foregoing requirements and needs, as well as others, by providing approaches for measuring devices and methods for detecting systematic errors in measuring signals, such as errors that adversely affect the determination of the direction of the origin of a signal.

In accordance with example embodiments of the present invention, a measuring device is provided. The measuring device comprises a processor, a first antenna adapted to receive a first signal, and a second antenna adapted to receive a second signal. The processor comprises a baseline measurement unit adapted to determine a baseline variance of a first variable and/or a second variable. The processor further comprises a variance unit adapted to determine a variance of the first variable and/or the second variable. The first variable and the second variable are each at least initially derived from at least the first signal and the second signal. The processing unit further comprises an error detection unit, adapted to determine whether a systematic error is present, based on the baseline variance and the variance of the first variable and/or the second variable. The measuring device thereby facilitates a determination of the presence of any systematic errors. By way of example, in the case of direction finding applications, the measuring device facilitates a determination as to the accuracy of a determined signal direction.

According to one embodiment, the measuring device is adapted to measure an electromagnetic signal. The first antenna is adapted to receive the electromagnetic signal as the first reception signal, and the second antenna is adapted to receive the electromagnetic signal as the second reception signal. The error unit is adapted to determine if a systematic error is present within the electromagnetic signal. The measuring device thereby facilitates a determination of the presence of systematic errors within the electromagnetic signal.

According to a further embodiment of the measuring device, the baseline unit is adapted to determine the baseline variance of the first variable and/or the second variable, while the electromagnetic signal is not present. In this embodiment, the variance unit is adapted to determine the variance of the first variable and/or the second variable, while the electromagnetic signal is present. The measuring device thereby facilitates an accurate determination of a baseline variance and of the variance.

According to a further embodiment of the measuring device, the error unit is adapted to determine at least one variance quotient by dividing the variance of the first variable by the baseline variance of the first variable, and/or by dividing the variance of the second variable by the baseline variance of the second variable. The error unit is further adapted to compare the at least one variance quotient with at least one variance threshold. The error unit is further adapted to determine the presence of a systematic error, when the at least one variance quotient is above the at least one variance threshold, and to determine no presence of a systematic error, when the at least one variance quotient is below the at least one variance threshold. An effective and efficient determining of the presence of systematic errors is thereby achieved.

According to a further embodiment of the measuring device, the processor comprises a threshold unit, which is adapted to determine the at least one variance threshold based on one or more of a power of the first signal, a power of the second signal, a number of simultaneously received signals, a number of determined locations of origin of received signals, a type of surroundings of the measuring device, an orientation of the measuring device, and an availability of computational resources. By dynamically determining the variance threshold, an accurate processing is achieved.

By way of example, the first variable can be a ratio of a power of a measuring point of the first signal and a power of a simultaneous measuring point of the second signal. The second variable may then be a phase difference of a measuring point of the first signal and a simultaneous measuring point of the second signal. By use of these variables, an especially accurate and efficient determination of the presence of systematic errors is achieved.

According to a further embodiment of the measuring device, the baseline unit is adapted to determine the baseline variance of the first variable as follows:

$$\sigma^2_{soll}(r_{mess,kl}) = r_{mess,kl}(r_{mess,kl}+1)\frac{2P_{noise}}{\sum_{i=1}^{M} P_{mess,l,i}};$$

and is further adapted to determine the baseline variance of the second variable as follows:

$$\sigma^2_{soll}(\Delta\phi_{mess,kl}) = \frac{r_{mess,kl}+1}{2r_{mess,kl}}\frac{P_{noise}}{\sum_{i=1}^{M} P_{mess,l,i}},$$

where
$\sigma_{soll}^2(r_{mess,kl})$ is the baseline variance of the first variable,
$r_{mess,kl}$ is the first variable—a ratio of a reception power of the first signal and the second signal,
k is an index indicating the first signal,
l is an index indicating the second signal,
$P_{noise}$ is a noise power,
$P_{mess,l,i}$ is a power of the electronic signal without noise,
i is an index of a number of values of the first signal and the second signal taken into account,
M is a number of the number of values of the first signal and the second signal taken into account,
$\sigma_{soll}^2(\Delta\phi_{mess,kl})$ is the baseline variance of the second variable, and
$\Delta\phi_{mess,kl}$ is the second variable—a phase difference of the phase of the first signal and the phase of the second signal.
An especially accurate and efficient determination of the baseline variances is thereby achieved.

Further advantageously, the variance unit is adapted to determine the variance of the first variable as follows:

$$V_{mess,k,i} = I_{mess,k,i} + iQ_{mess,k,i}$$

$$P_{mess,k,i} = I_{mess,k,i}^2 + Q_{mess,k,i}^2 - P_{noise}$$

$$\sigma_{ist}^2(r_{mess,kl}) = (r_{mess,kl}^2 + 1)\frac{\sum_{i=1}^{M}(P_{mess,k,i} - r_{mess,kl}P_{mess,l,i})^2}{\left[\left(\sum_{i=1}^{M}P_{mess,k,i}\right)^2 + \left(\sum_{i=1}^{M}P_{mess,l,i}\right)^2\right]}$$

$$r_{mess,kl} = \frac{\sum_{i=1}^{M}P_{k,obs,n}}{\sum_{i=1}^{M}P_{l,obs,n}}$$

According to a further embodiment of the measuring device, the variance unit is adapted to determine the variance of the second variable as follows:

$$V_{mess,k,i} = I_{mess,k,i} + iQ_{mess,k,i}$$

$$P_{mess,k,i} = I_{mess,k,i}^2 + Q_{mess,k,i}^2 - P_{noise}$$

$$\sigma_{ist}^2(\Delta\phi_{mess,kl}) = \frac{\sum_{i=1}^{M}[\mathfrak{I}_{kl,i} - \tan(\Delta\varphi_{mess,kl})\mathfrak{R}_{kl,i}]^2}{(\tan^2(\Delta\phi_{mess,kl}) + 1))\left[\left(\sum_{i=1}^{M}\mathfrak{R}_{kl,i}\right)^2 + \left(\sum_{i=1}^{M}\mathfrak{I}_{kl,i}\right)^2\right]}$$

$$\mathfrak{I}_{kl,i} = I_{k,i}Q_{l,i} - I_{l,i}Q_{k,i}$$

$$\mathfrak{R}_{kl,i} = I_{k,i}I_{l,i} - Q_{k,i}Q_{l,i}$$

$$\Delta\varphi_{mess,ij} = \arctan\left[\frac{\sum_{i=1}^{M}\mathfrak{I}_{kl,i}}{\sum_{i=1}^{M}\mathfrak{R}_{kl,i}}\right],$$

where
$V_{mess,k,i}$ is an antenna voltage of antenna k,
$I_{mess,k,i}$ is an inphase component of the antenna voltage of antenna k,
$Q_{mess,k,i}$ is a quadrature component of the antenna voltage of antenna k,
$P_{mess,k,i}$ is a power of the electronic signal without noise,
$P_{noise}$ is a noise power,
$\sigma_{ist}^2(\Delta\phi_{mess,kl})$ is the variance of the first variable,
$r_{mess,kl}$ is the first variable—a ratio of a reception power of the first signal and the second signal,
M is a number of the number of values of the first signal and the second signal taken into account,
i is an index of a number of values of the first signal and the second signal taken into account,
k is an index indicating the first signal,
l is an index indicating the second signal,
$P_{k,obs,n}$ is an observed power at antenna k,
$P_{l,obs,n}$ is an observed power at antenna l,
$\sigma_{ist}^2(\Delta\phi_{mess,kl})$ is the variance of the second variable,
$\Delta\phi_{mess,kl}$ is the second variable—a phase difference of the phase of the first signal and the phase of the second signal,
$I_{k,i}$ is an inphase component of the antenna voltage of antenna k,
$Q_{l,i}$ is a quadrature component of the antenna voltage of antenna l,
$I_{l,i}$ is an inphase component of the antenna voltage of antenna l,
$Q_{k,i}$ is a quadrature component of the antenna voltage of antenna k,
$\mathfrak{I}_{kl,i}$ is a first auxiliary variable, and
$\mathfrak{R}_{kl,i}$ is a second auxiliary variable.
The measuring device thereby facilitates a determination of the variance of the first and second variable in an especially accurate and efficient manner.

According to a further embodiment, the measuring device comprises a third antenna adapted to receive a third signal. By way of example, the third antenna receives the electronic signal as the third signal. By way of further example, the first variable and the second variable are successively derived from the first signal and the second signal, the first signal and the third signal, and the second signal and the third signal. Further, the baseline unit, the variance unit and the error unit are adapted to perform their respective processing steps successively for the first signal and the second signal, the first signal and the third signal, and the second signal and the third signal. The same processing is thus performed three times for three different antenna pairs. The measuring device thereby achieves a significant increase in accuracy for the determination of the systematic errors. By way of further example, the results of the determination of the systematic errors can be OR-connected, such that, as soon as one of the error determination steps of the error unit for one of the possible antenna pairs shows a systematic error, the respective signal is considered as comprising a systematic error. Moreover, a processing of more than three antenna pairs is also possible.

Alternatively, in embodiments where the measuring device comprises a third antenna adapted to receive a third signal, the first variable and the second variable can be directly derived from the first, second and third signals. In this case, a more complex computation is necessary, but an even more accurate determination of the systematic error is achieved. Moreover, a processing of more than three antenna pairs is also possible in this alternative case.

According to a further embodiment, the measuring device comprises a display unit adapted to display the results of the determination of the presence or absence of systematic errors within the electromagnetic signal. According to a further embodiment, alternately or additionally, the measuring device comprises a communication unit adapted to output information regarding the results of the determination of the presence or absence of systematic errors within the electromagnetic signal to an external device. It is thereby possible to either display or hand on for further processing the determined information regarding the presence or absence of systematic errors within the electromagnetic signal.

According to a further embodiment, the measuring device comprises a direction determining unit adapted to determine from at least the first signal and the second signal, a direction of origin of the electromagnetic signal. It is then possible to determine, if the determined direction of origin is in fact correct or might be prone to a systematic error. According to a further embodiment, the measuring device also comprises a display unit. By way of example, the display unit may be adapted to display the direction of origin of the electromagnetic signal (e.g., as a line or arrow pointing in the direction of the electromagnetic signal), and to display the results of the determination of the presence or absence of systematic errors within the electromagnetic signal (e.g., as one or more of a color, shape, shading, transparency of the line or arrow, or of a shape attached to the tip of the line or arrow. A user thereby can very easily determine, if a determined whether or not the direction of origin of an electromagnetic signal is prone to systematic errors. By way of further example, the display unit may be adapted to display the direction of origin of the electromagnetic signal (e.g., as a line or arrow pointing in the direction of the electromagnetic signal), only if the error unit has determined that a systematic error is not present within the electromagnetic signal. The user is thereby only confronted with determined directions of the origin of the measured signals that are not prone to systematic errors. For example, in a situation with a lack of registered signals and directions of origin, this can significantly ease the user workload.

In accordance with further example embodiments of the present invention, a measuring method is provided. The method comprises receiving (by a first antenna) a first signal, and receiving (by a second antenna) a second signal. The method further comprises determining a baseline variance of a first variable and/or a second variable, and determining a variance of the first variable and/or the second variable. By way of example, the first variable and the second variable are each at least initially derived from at least the first signal and the second signal. The method further comprises determining the presence of at least one systematic error, where the determination is based on the baseline variance and the variance of the first variable and/or the second variable. The method thereby facilitates an efficient and accurate determination of the presence of systematic errors in the signal measurements.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

Approaches for measuring devices and methods for detecting systematic errors in measuring signals, such as errors that adversely affect the determination of the direction of the origin of a signal, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 5:
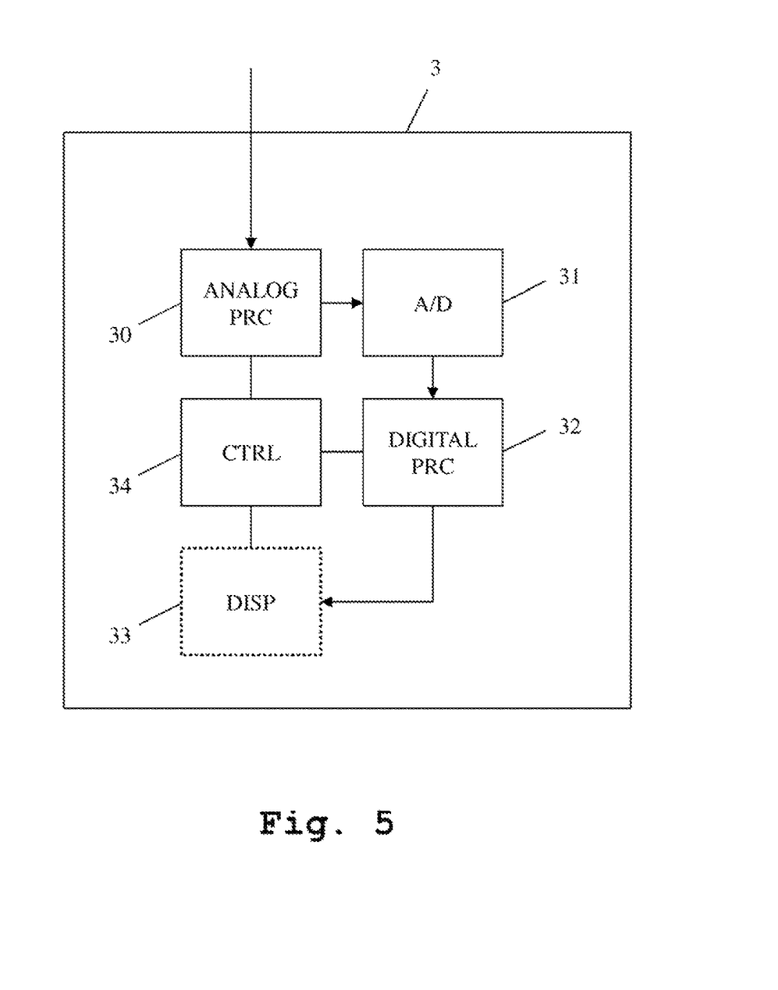
FIG. 5 shows a block diagram of the processor of the measuring device of FIG. 1, in accordance with example embodiments.
Figure 6:
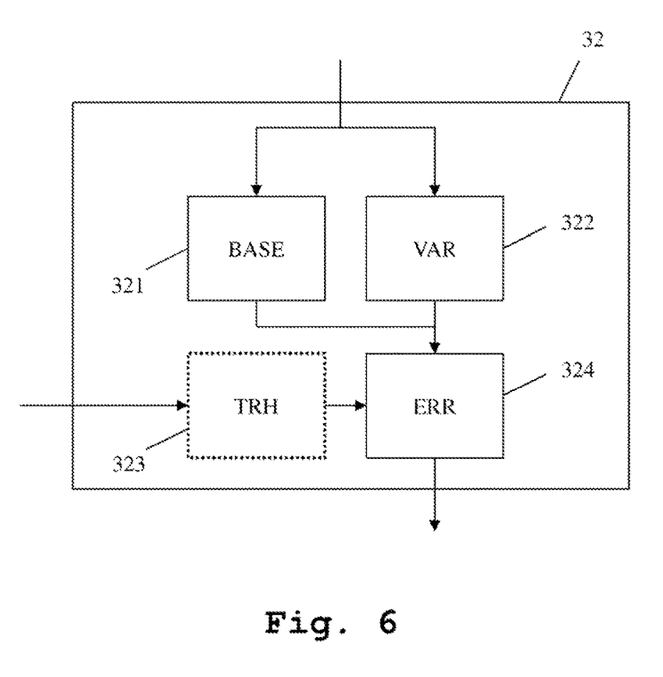
FIG. 6 shows block diagram of the digital processor of FIG. 5, in accordance with example embodiments.
Figure 7:
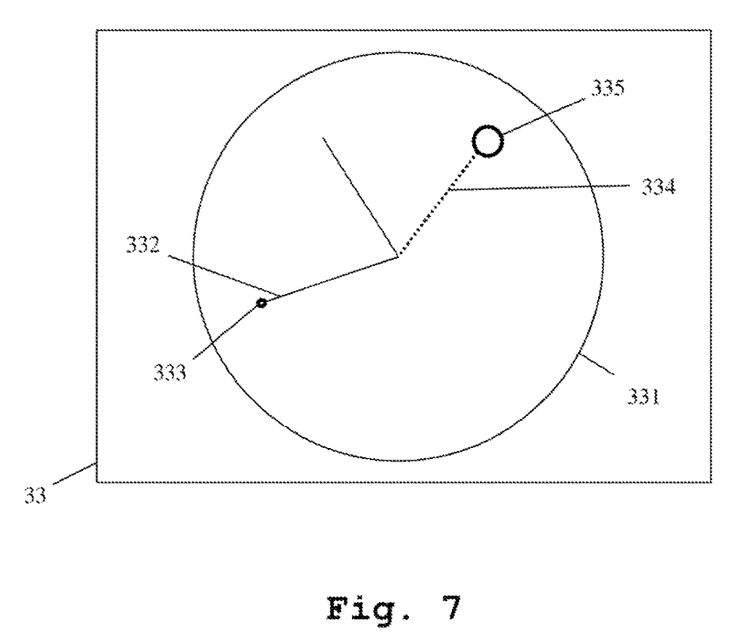
FIG. 7 shows a display of a measuring device, in accordance with example embodiments.
Figure 8:
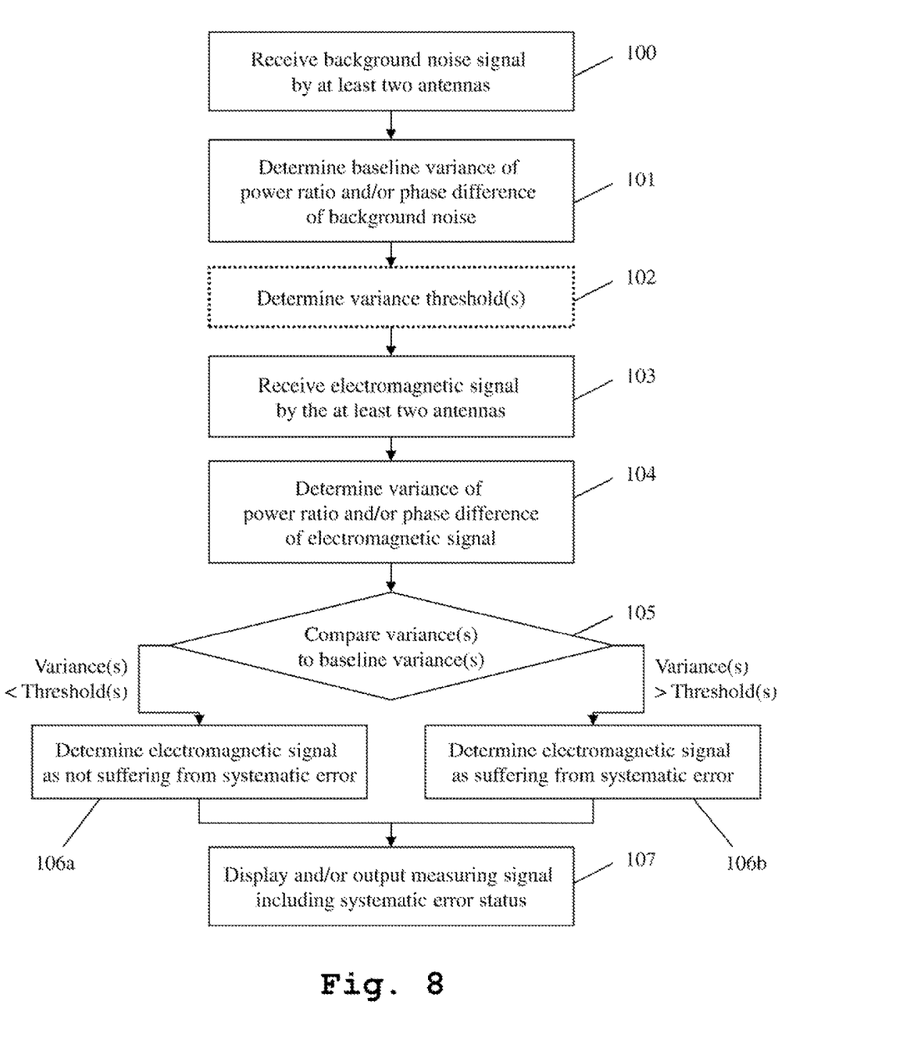
FIG. 8 shows a flow chart of a measuring method, in accordance with example embodiments.

First, the general architecture of example embodiments of a measuring device of the present invention are described with reference to FIGS. 1 and 2. With reference to FIGS. 3a, 3b, 3c, 4a, 4b and 4c, underlying problems with current measuring devices and methods are discussed along with the solutions provided by aspects of different example embodiments of the present invention. With reference to FIGS. 5 and 6, further architecture details, and respective functions, of example embodiments of a measuring device of the present invention are described. With reference to FIG. 7, example embodiments for the display and presentation of measurement results are discussed. With reference to FIG. 8, an example embodiment of a measuring method of the present invention is described. Similar entities and reference numbers in different figures have been partially omitted.

Figure 1:
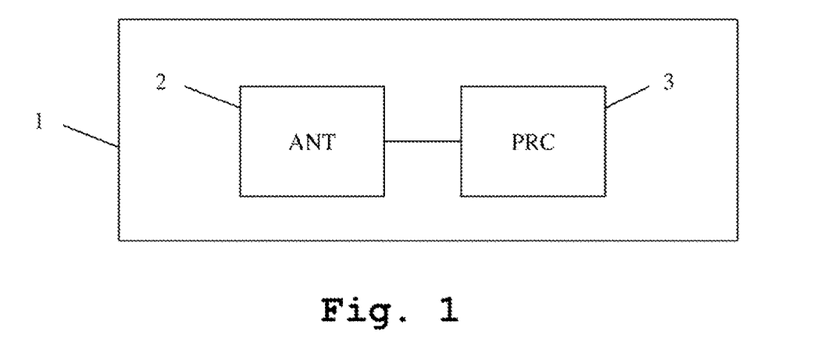
FIG. 1 shows a block diagram of a measuring device, in accordance with example embodiments.

FIG. 1 shows a block diagram of a measuring device 1, in accordance with example embodiments of the present invention. The measuring device 1 comprises an antenna unit (or antenna) 2 connected to a processing unit (or processor) 3. Electromagnetic signals are received by the antenna unit 2 and processed by the processing unit 3. By way of example, the processing unit 3 determines the presence of any systematic errors in the electromagnetic signals received by the antenna unit 2 (e.g., resulting from multi-path propagation of the electromagnetic signal). By way of further example, the processing unit 3 may also determine the direction of origin of the electromagnetic signals, and display the results on a display (not shown in FIG. 1). The electromagnetic signals may, for example, be radar pulses or radio transmissions.

Figure 2:
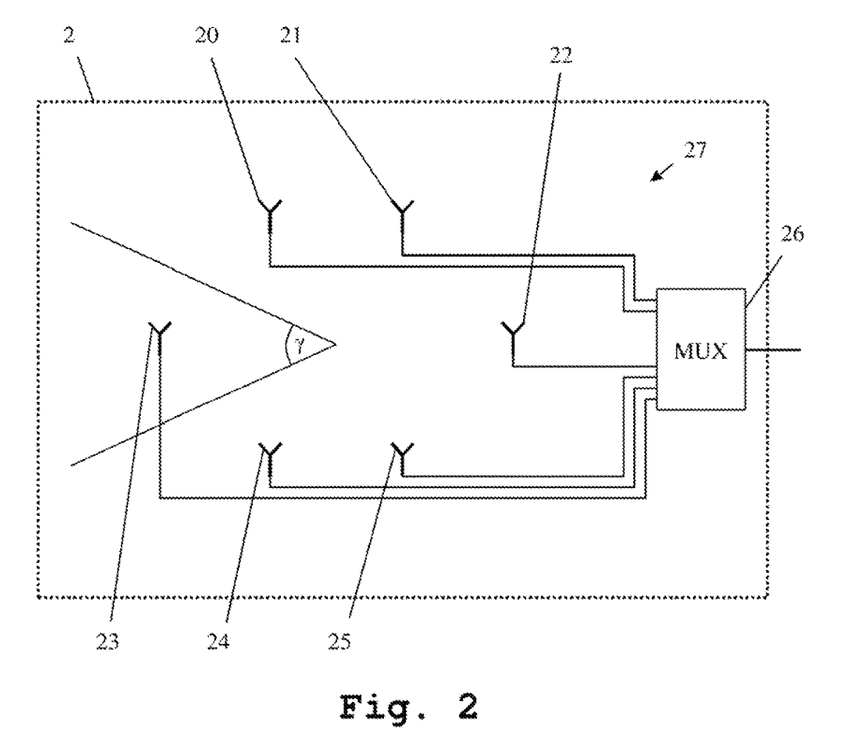
FIG. 2 shows a block diagram of an antenna unit of the measuring device of FIG. 1, in accordance with example embodiments.

FIG. 2 shows a block diagram of an antenna unit 2 of the measuring device 1 of FIG. 1, in accordance with example embodiments of the present invention. The antenna unit 2 comprises an antenna array 27, comprising a plurality of antennas 20-25 connected to a multiplexing unit (or multiplexer) 26. The multiplexing unit 26 operates to connect a number of antennas out of the total available antennas 20-25 to the processing unit 3. The number of connected antennas can be pre-specified or can be set by the processing unit 3. For example, a connection of two or three antennas is possible, and also a simultaneous connection of any other number of antennas is possible. In an alternative embodiment, the multiplexing unit 26 can be omitted.

By way of example, the antennas 20, 23 and 24 may be connected by the multiplexing unit 26 to the processing unit 3. In this case, a receiving angle γ is achieved. Within this angle, the direction of incoming electromagnetic signals can be determined. Also a determination of the presence systematic errors within the received electromagnetic signals is possible within this angle.

By way of further example, the antenna unit 2 comprises at least two different antennas. Alternatively, at least five different antennas are present. Alternatively, at least ten different antennas are present. For being able to detect a direction of an incoming signal, at least the signals of two antennas have to be used. This is also the case for determining the presence of systematic errors within the received electromagnetic signals.

Figure 3A:
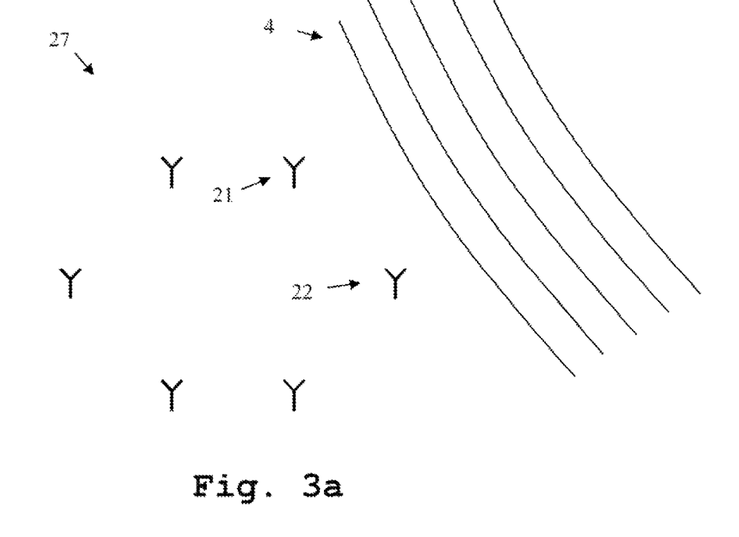
FIG. 3a shows an example of the receipt of an electromagnetic signal by antennas of a measuring device, in accordance with example embodiments.
Figure 3B:
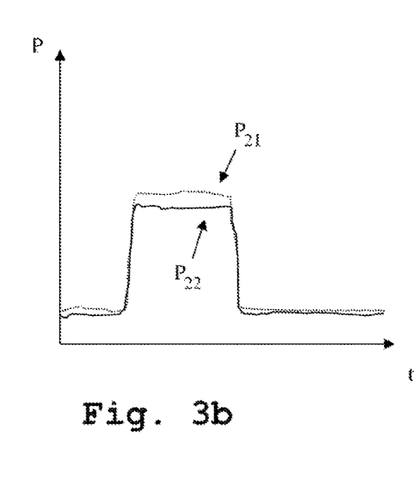
FIG. 3b shows power levels received over time by the antennas of the measuring device of FIG. 3a, in accordance with example embodiments.
Figure 3C:
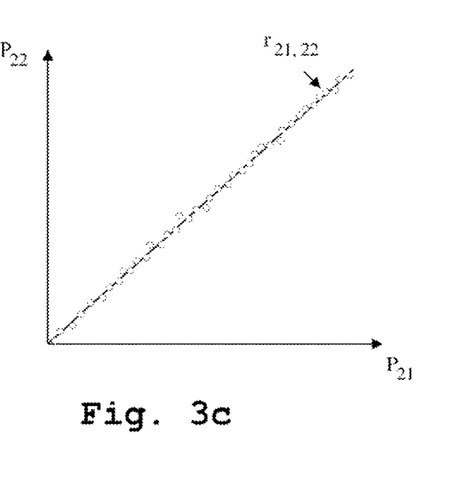
FIG. 3c shows power levels, with respect to each other, of antennas of the measuring device of FIG. 3a, in accordance with example embodiments.

FIG. 3a shows an example of the receipt of an electromagnetic signal 4 by antennas of a measuring device, in accordance with example embodiments of the present invention. With reference to FIG. 3a, the antennas 21 and 22 receive the incident electromagnetic signal 4 roughly at the same time and with the same power. This can readily be seen in FIG. 3b, illustrating the power levels of the signals received by the antennas 21, 22 over time. Further, FIG. 3c shows the power levels of the respective signals of the antennas 21, 22, with respect to each other. With reference to FIG. 3c, it is evident that the power levels lie very close to a line starting in the origin of the coordinate system, which signifies that a quotient of the powers received at the antennas 21 and 22 has a relatively low variance.

Figure 4A:
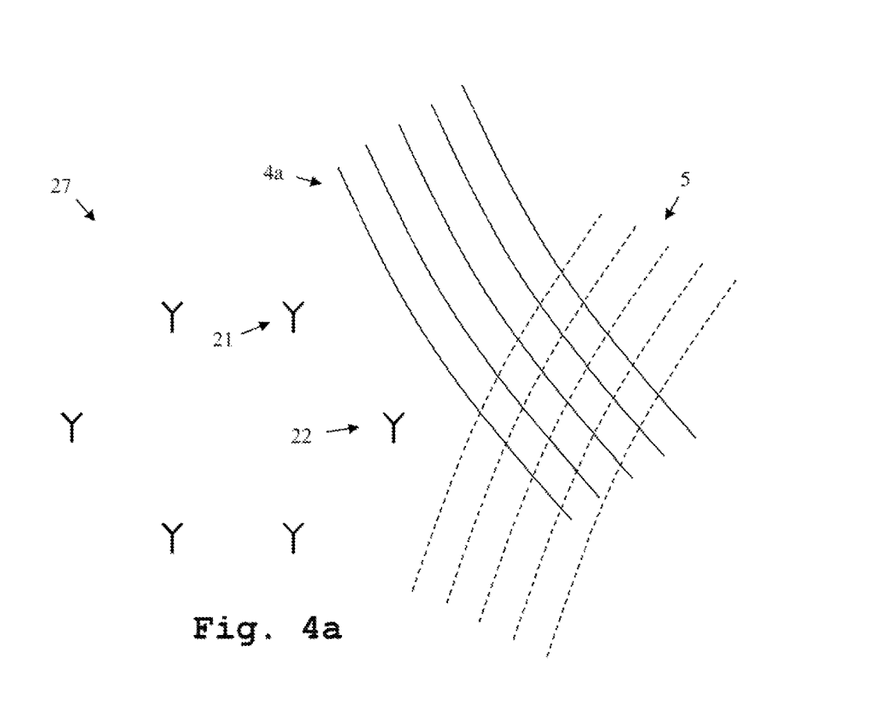
FIG. 4a shows an example of the receipt of an electromagnetic signal with a multi-path error component by antennas of a measuring device, in accordance with example embodiments an electromagnetic signal.
Figure 4B:
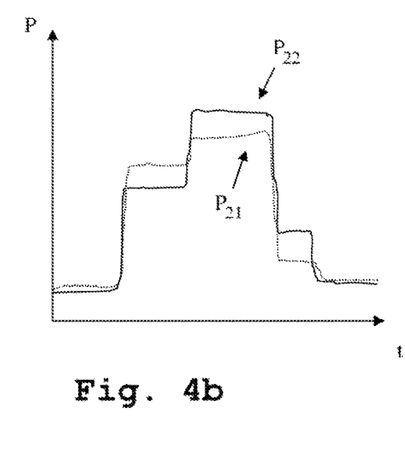
FIG. 4b shows power levels received over time by the antennas of the measuring device of FIG. 4a, in accordance with example embodiments.
Figure 4C:
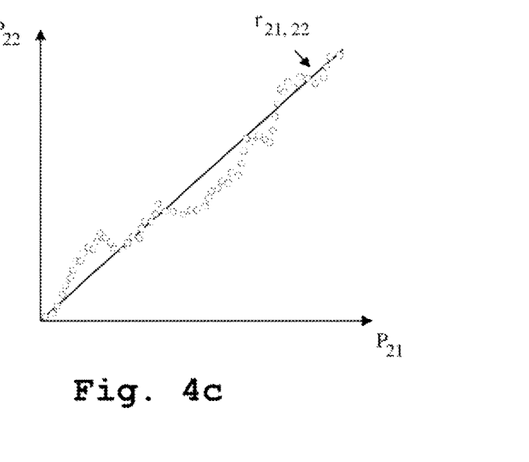
FIG. 4c shows power levels, with respect to each other, of antennas of the measuring device of FIG. 4a, in accordance with example embodiments.

FIG. 4a shows an example of the receipt of an electromagnetic signal with a multi-path error component by antennas of a measuring device, in accordance with example embodiments an electromagnetic signal. With reference to FIG. 4a, the electromagnetic signal 4a comprises a multi-path propagation component 5, which arrives from a different direction of origin, for example, in the case it is reflected by a house or other structure. The signal thereby reaches the antennas 21, 22 at significantly different times, and overlaps with the original line-of-sight of the electromagnetic signal 4. The antennas 21, 22 thus receive significantly different signals then shown in FIG. 3b. FIG. 4b shows power levels of the signals P21, P22 received over time. Further, FIG. 4c shows the power levels of the respective signals of the antennas 21, 22, with respect to each other. With reference to FIG. 4c, it is evident that the power levels no longer adhere to the line starting in the origin, which signifies that a quotient of the powers received at the antennas 21, 22 has a significantly increased variance than those shown in FIG. 3c.

FIG. 5 shows a block diagram of the processing unit 3 of the measuring device of FIG. 1, in accordance with example embodiments of the present invention. The processing unit 3 comprises an analog processing unit (or processor) 30, which is supplied with the signal of the antenna unit 2. The processing unit 3 further comprises an analog-digital-converter 31, which is connected to the analog processing unit 30. The analog-digital-converter 31 is also connected to a digital processing unit (or digital processor) 32, which is connected to a display unit (or display) 33. The analog processing unit 30, the digital processing unit 32 and the display unit 33 are connected to a control unit (or controller) 34, which operates to control the connected components. Alternatively, the measuring device 1, or the processing unit 3, does not include a display unit 33, but instead includes a communication unit configured to transfer the measuring results to an external device, for example, for further processing.

By way of example, signals from the antenna unit 2 are received by the analog processing unit 30. The signals comprise the signals of the individual antennas 20-25, or of some of the antennas 20-25, which are currently connected to the analog processing unit 30 by use of the multiplexing unit 26. Alternatively, the signals of all antennas 20-25 can be transmitted to the analog processing unit 30 simultaneously, and the multiplexing unit can be omitted.

The signals are then processed by the analog processing unit 30. By way of example, an amplification and a power determination can be performed. The resulting signals are then provided to the analog-digital converter 31, which digitizes the signals. The digitized signals are then provided to the digital processing unit 32, which performs digital processing. By way of example, the digital processing unit 32 determines the presence of systematic errors in the received electromagnetic signal. By way of further example, the digital processing unit 32 may also determine of the origin direction of the detected electromagnetic signal.

Results of the processing by the digital processing unit 32 are then provided to the display unit 33, which displays the presence or absence of any systematic errors, and optionally may also display the origin direction of the electromagnetic signal.

FIG. 6 shows block diagram of the digital processor 32 of FIG. 5, in accordance with example embodiments of the present invention. The digital processor 32 comprises a baseline unit 321, which is connected to the analog-digital-converter 31. The digital processor 32 further comprises a variance unit 322, which is also connected to the analog-digital-converter 31. The baseline unit 321 and the variance unit 322 are both connected to an error unit 324, which in turn is connected to the display unit 33. Optionally, a threshold unit 323 is also included, which is also connected to the error unit 324.

By way of example, a digital measuring voltage $V_{mess,k,i}$ is received:

$$V_{mess,k,i} = A_{mess,k,i} \exp(j\phi_{mess,k,i}),$$

where
k=1, 2, . . . , N
$A_{mess,k,i}$ is a measuring amplitude,
$\phi_{mess,k,i}$ is a measuring phase,
k is an antenna number index,
i is a measuring value index, and
N is a total number of measurements.

A first variable $r_{mess,kl,i}$ and a second variable $\Delta\phi_{mess,kl,i}$ are then determined as follows:

$$r_{mess,kl,i} = \frac{A_{mess,k,i}}{A_{mess,l,i}}$$

$$\Delta\phi_{mess,kl,i} = \phi_{mess,k,i} - \phi_{mess,l,i},$$

where
$r_{mess,kl,i}$ is a quotient between a measuring amplitude of antenna k and antenna l,
$\Delta\phi_{mess,kl,i}$ is a phase difference between antenna k and antenna l,
k is an antenna number index,
l is an antenna number index, and
i is a measuring value index.

A variance of the first variable is then determined as follows:

$$\sigma^2(r_{mess,kl}) = \frac{1}{M}\sum_{i=1}^{M}[r_{mess,kl,i}]^2 - \left[\frac{1}{M}\sum_{i=1}^{M}r_{mess,kl,i}\right]^2,$$

where
$\sigma^2(r_{mess,kl})$ is the variance of the first variable,
M is a total number of considered measuring values,
i is a measuring value index, and
$r_{mess,kl,i}$ is the first variable, which is a quotient between a measuring amplitude of antenna k and antenna l.

A variance of the second variable is also determined as follows:

$$\sigma^2(\Delta\phi_{mess,kl}) = \frac{1}{M}\sum_{i=1}^{M}[\Delta\phi_{mess,kl,i}]^2 - \left[\frac{1}{M}\sum_{i=1}^{M}\Delta\phi_{mess,kl,i}\right]^2,$$

where
$\sigma^2(\Delta\phi_{mess,kl})$ is the variance of the second variable,
M is a total number of considered measuring values,
i is a measuring value index, and
$\Delta\phi_{mess,kl,i}$ is the second variable, which is a phase difference between antenna k and antenna l.

At this point, considering the measuring error, it is not possible to accurately determine if the presence of any systematic errors in the electromagnetic signal (e.g., resulting from multi-path propagation of the signal).

Therefore, in accordance with example embodiments of the present invention, the baseline unit 321 is adapted to determine a baseline variance of one or more of the first variable and the second variable. As illustrated above, the first variable is a ratio of a power of a measuring point of the first signal and a power of a simultaneous measuring point of the second signal. As also illustrated above, the second variable is a phase difference of a measuring point of the first signal and a simultaneous measuring point of the second signal. The baseline variances are then determined as follows:

$$\sigma^2_{soll}(r_{mess,kl}) = r_{mess,kl}(r_{mess,kl}+1)\frac{2P_{noise}}{\sum_{i=1}^{M}P_{mess,l,i}},$$

-continued $$\sigma_{soll}^2(\Delta\phi_{mess,kl}) = \frac{r_{mess,kl}+1}{2r_{mess,kl}} \frac{P_{noise}}{\sum_{i=1}^{M} P_{mess,l,i}},$$

where $\sigma_{soll}^2(r_{mess,kl})$ is the baseline variance of the first variable,
$r_{mess,kl}$ is the first variable—a ratio of a reception power of the first signal and the second signal,
k is an index indicating the first signal,
l is an index indicating the second signal,
$P_{noise}$ is a noise power,
$P_{mess,l,i}$ is a power of the electronic signal without noise,
i is an index of a number of values of the first signal and the second signal taken into account,
M is a number of the number of values of the first signal and the second signal taken into account,
$\sigma_{soll}^2(\Delta\phi_{mess,kl})$ is the baseline variance of the second variable, and
$\Delta\phi_{mess,kl}$ is the second variable—a phase difference of the phase of the first signal and the phase of the second signal.

The baseline variances are determined while the electromagnetic signal is not being received by the antennas. Therefore, only background noise is taken into consideration for determining the baseline variances of the first and second variables. Then, upon receipt of the electromagnetic signal, the variance unit 322 determines the variances of one or more of the first and second variables of the electromagnetic signal, where the variances are determined as follows:

$$V_{mess,k,i} = I_{mess,k,i} + iQ_{mess,k,i}$$

$$P_{mess,k,i} = I_{mess,k,i}^2 + Q_{mess,k,i}^2 - P_{noise}$$

$$\sigma_{ist}^2(r_{mess,kl}) = (r_{mess,kl}^2 + 1) \frac{\sum_{i=1}^{M}(P_{mess,k,i} - r_{mess,kl}P_{mess,l,i})^2}{\left[\left(\sum_{i=1}^{M} P_{mess,k,i}\right)^2 + \left(\sum_{i=1}^{M} P_{mess,l,i}\right)^2\right]}$$

$$r_{mess,kl} = \frac{\sum_{i=1}^{M} P_{k,obs,n}}{\sum_{i=1}^{M} P_{l,obs,n}}$$

$$\sigma_{ist}^2(\Delta\phi_{mess,kl}) = \frac{\sum_{i=1}^{M}[\Im_{kl,i} - \tan(\Delta\varphi_{mess,kl})\mathfrak{R}_{kl,i}]^2}{(\tan^2(\Delta\phi_{mess,kl})+1))\left[\left(\sum_{i=1}^{M} \mathfrak{R}_{kl,i}\right)^2 + \left(\sum_{i=1}^{M} \Im_{kl,i}\right)^2\right]}$$

$$\Im_{kl,i} = I_{k,i}Q_{l,i} - I_{l,i}Q_{k,i}$$

$$\mathfrak{R}_{kl,i} = I_{k,i}I_{l,i} - Q_{k,i}Q_{l,i}$$

$$\Delta\varphi_{mess,ij} = \arctan\left[\frac{\sum_{i=1}^{M} \Im_{kl,i}}{\sum_{i=1}^{M} \mathfrak{R}_{kl,i}}\right],$$

where $V_{mess,k,i}$ is an antenna voltage of antenna k,
$I_{mess,k,i}$ is an inphase component of the antenna voltage of antenna k,
$Q_{mess,k,i}$ is a quadrature component of the antenna voltage of antenna k,
$P_{mess,k,i}$ is a power of the electronic signal without noise,
$P_{noise}$ is a noise power,
$\sigma_{ist}^2(r_{mess,kl})$ is the variance of the first variable,
$r_{mess,kl}$ is the first variable—a ratio of a reception power of the first signal and the second signal,
M is a number of the number of values of the first signal and the second signal taken into account,
i is an index of a number of values of the first signal and the second signal taken into account,
k is an index indicating the first signal,
l is an index indicating the second signal,
$P_{k,obs,n}$ is an observed power at antenna k,
$P_{l,obs,n}$ is an observed power at antenna l,
$\sigma_{ist}^2(\Delta\phi_{mess,kl})$ is the variance of the second variable,
$\Delta\phi_{mess,kl}$ is the second variable—a phase difference of the phase of the first signal and the phase of the second signal,
$I_{k,i}$ is an inphase component of the antenna voltage of antenna k,
$Q_{k,i}$ is a quadrature component of the antenna voltage of antenna k,
$I_{l,i}$ is an inphase component of the antenna voltage of antenna l,
$Q_{l,i}$ is a quadrature component of the antenna voltage of antenna l,
$\Im_{kl,i}$ is a first auxiliary variable, and
$\mathfrak{R}_{kl,i}$ is a second auxiliary variable.

By way of example, the foregoing functionality would be suitable for implementation in a field programmable gate array (FPGA) or multi-purpose processor, since it divisions are avoided to a large degree. Alternatively, the functionality may be implemented in an application specific integrated circuit (ASIC).

Now that baseline variances of the first and/or second variables are determined and also variances of the first and/or second variables of the electromagnetic signal are determined, based thereon, a determination of the presence or absence of systematic errors in the electromagnetic signal can be performed. In this context, by way of example, the error unit 324 (which is supplied with the baseline variances by the baseline unit 321 and the variances by the variance unit 322) determines a quotient by dividing the variance of the first variable by the baseline variance of the first variable and/or by dividing the variance of the second variable by the baseline variance of the second variable. The variance quotient(s) are then compared to respective variance threshold(s). For example, when a variance is above the respective variance threshold, it can be concluded that a systematic error is present in the electromagnetic signal, and, alternatively, when a variance is below the respective variance threshold, it can be concluded that no systematic error is present in the electromagnetic signal. For example, the variance threshold may be set between 1.5 and 10, and, more precisely, between 2 and 5.

Alternatively, the variance threshold can be dynamically determined by the threshold unit 323. By way of example, the threshold unit 323 may determine the variance threshold dynamically based upon a number of criteria, including one or more of a power of the first signal, a power of the second signal, a number of simultaneously received signals, a number of determined locations of origin of received signals, an availability of computational resources, a type of surrounding of the measuring device, and an orientation of the measuring device.

By way of example, a high power of the first and/or second signal leads to a low variance threshold. By way of further example, a high number of determined locations of origin of received signals leads to a high variance threshold.

By way of further example, an availability of computational resources leads to a high variance threshold, while a lack of computational resources leads to a low variance threshold. By way of further example, a high number of determined locations of origin of received signals leads to a low variance threshold.

Further, the surroundings of the measuring device can also influence the variance threshold. By way of example, a rural environment, with a scarce occurrence of multi-path propagation leads to a low variance threshold, while an urban environment, with many structures and a resulting more often occurrence of multi-path propagation, leads to a high variance threshold.

Further, the orientation of the measuring device can influence the variance threshold. By way of example, if the measuring device is oriented towards a direction from which the occurrence of an electromagnetic signal is probable, this leads to a high variance threshold. Whereas, if the measuring device is oriented towards a direction with a low probability of the occurrence of an electromagnetic signal, this leads to a low variance threshold.

FIG. 7 shows a display 33 of a measuring device, in accordance with example embodiments of the present invention. Within a circle 331, lines 332 and 334 are depicted indicating directions of origin of electromagnetic signals. Here, the tips of the lines 332 and 334 are each connected to a shape 333 and 335, which indicates whether or not the respective originating electromagnetic signal suffers from systematic errors. For example the solid shape 333 indicates that the underlying electromagnetic signal does not suffer from systematic errors, while the outlined shape 335 indicates that the underlying electromagnetic signal suffers from systematic errors. Further, the line 334 is a dashed line, which may also or alternatively indicate that the respective underlying electromagnetic signal suffers from systematic errors. According to further embodiments, the options for indicating the presence or absence of systematic errors in the electromagnetic signal may include one or more of use of colors, shapes, shading, and transparency of the line or an arrow or the shape attached to the tip of the line or arrow.

FIG. 8 shows a flow chart of a measuring method, in accordance with example embodiments of the present invention. In step 100, a background noise signal is received by at least two antennas. In step 101, a baseline variance of a first variable and/or a second variable, such as a power ratio and/or a phase difference of the background noise signal, is determined. In step 102, variance thresholds are determined, as explained earlier. In step 103, an electromagnetic signal is received by the at least two antennas. In step 104, a variance of the first and/or second variable, such as the variance of a power ratio and/or a phase difference of the electromagnetic signal, is determined. In step 105, the variances are compared to respective variance thresholds. If none of the variances is above the variance threshold, in step 106a, it is determined that the electromagnetic signal does not suffer from systematic errors. If at least one of the variances is above the respective variance threshold, in step 106b, it is determined that the electromagnetic signal suffers from systematic errors. In step 107, the results are either displayed or output to an external device.

The invention is not limited to the examples. The characteristics of the example embodiments can be used in any advantageous combination. All features claimed in the claims and/or described in the description and/or drawn in the drawings can be combined. Especially, all features of the dependent device claims can also be combined with the independent method claim.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A measuring device comprising:
   a first antenna configured to receive a first signal, and a second antenna configured to receive a second signal; and
   a processor configured to determine a first variable and a second variable based at least in part on the first signal and the second signal, to determine a baseline variance of each of one or more of the first variable and the second variable, to determine a variance of each of one or more of the first variable and the second variable, and to determine a presence or absence of at least one systematic error of the received first signal and the received second signal, based on the determined baseline variances of the first variable and the second variable and the determined variances of the first variable and the second variable; and
   wherein the measuring device is configured to measure an electromagnetic signal, and wherein the first antenna is configured to receive the electromagnetic signal as the first signal, and the second antenna is configured to receive the electromagnetic signal as the second signal, and wherein the presence or absence of the at least one systematic error is determined with respect to the electromagnetic signal,
   wherein the processor is further configured to determine one or more of a first variance quotient by dividing the variance of the first variable by the baseline variance of the first variable, and a second variance quotient by dividing the variance of the second variable by the baseline variance of the second variable, and to compare each of the one or more first and second variance quotients with a respective variance threshold,
   wherein, when the comparison reveals that at least one of the first and second variance quotients is above the respective variance threshold, the processor determines that at least one systematic error is present in the electromagnetic signal, and, when the comparison reveals that at least one of the first and second variance quotients is below the respective variance threshold, the processor determines that no systematic errors are present in the electromagnetic signal, and
   wherein the first variable is a ratio of a power of a measuring point of the first signal and a power of a measuring point of the second signal simultaneous with the measuring point of the first signal, and wherein the second variable is a phase difference of the measuring point of the first signal and the measuring point of the second signal.

2. The measuring device according to claim 1, wherein the determination of the baseline variance of each of one or more of the first variable and the second variable is performed before receipt of the electromagnetic signal, and wherein the determination of the variance of each of one or more of the first variable and the second variable is performed once the electromagnetic signal is received.

3. The measuring device according to claim 1, wherein the processing unit is further configured to determine the respective variance thresholds based on one or more of a power of one or more of the first signal and the second signal, a number of simultaneously received signals, a number of determined locations of origin of received signals, an availability of computational resources, a type of surrounding of the measuring device, and an orientation of the measuring device.

4. The measuring device according to claim 1, wherein:
the baseline variance of the first variable is determined as $$\sigma^2_{soll}(r_{mess,kl}) = r_{mess,kl}(r_{mess,kl} + 1) \frac{2 P_{noise}}{\sum\limits_{i=1}^{M} P_{mess,l,i}},$$

and the baseline variance of the second variable is determined as $$\sigma^2_{soll}(\Delta \phi_{mess,kl}) = \frac{r_{mess,kl} + 1}{2 r_{mess,kl}} \frac{P_{noise}}{\sum\limits_{i=1}^{M} P_{mess,l,i}},$$

where
$\sigma_{soll}^2(r_{mess,kl})$ is the baseline variance of the first variable,
$r_{mess,kl}$ is the first variable—a ratio of a reception power of the first signal and the second signal,
k is an index indicating the first signal,
l is an index indicating the second signal,
$P_{noise}$ is a noise power,
$P_{mess,l,i}$ is a power of the electronic signal without noise,
i is an index of a number of values of the first signal and the second signal taken into account,
M is a number of the number of values of the first signal and the second signal taken into account,
$\sigma_{soll}^2(\Delta \phi_{mess,kl})$ is the baseline variance of the second variable, and
$\Delta \phi_{mess,kl}$ is the second variable—a phase difference of the phase of the first signal and the phase of the second signal.

5. The measuring device according to claim 1, wherein:
the variance of the first variable is determined as $$V_{mess,k,i} = I_{mess,k,i} + i Q_{mess,k,i}$$

$$P_{mess,k,i} = I^2_{mess,k,i} + Q^2_{mess,k,i} - P_{noise}$$

$$\sigma^2_{ist}(r_{mess,kl}) = (r^2_{mess,kl} + 1) \frac{\sum\limits_{i=1}^{M} (P_{mess,k,i} - r_{mess,kl} P_{mess,l,i})^2}{\left[ \left( \sum\limits_{i=1}^{M} P_{mess,k,i} \right)^2 + \left( \sum\limits_{i=1}^{M} P_{mess,l,i} \right)^2 \right]}$$

$$r_{mess,kl} = \frac{\sum\limits_{i=1}^{M} P_{k,obs,n}}{\sum\limits_{i=1}^{M} P_{l,obs,n}}$$

and the variance of the second variable is determined as $$V_{mess,k,i} = I_{mess,k,i} + i Q_{mess,k,i}$$

$$P_{mess,k,i} = I^2_{mess,k,i} + Q^2_{mess,k,i} - P_{noise}$$

$$\sigma^2_{ist}(\Delta \phi_{mess,kl}) = \frac{\sum\limits_{i=1}^{M} [\mathfrak{I}_{kl,i} - \tan(\Delta \varphi_{mess,kl}) \mathfrak{R}_{kl,i}]^2}{(\tan^2(\Delta \phi_{mess,kl}) + 1) \left[ \left( \sum\limits_{i=1}^{M} \mathfrak{R}_{kl,i} \right)^2 + \left( \sum\limits_{i=1}^{M} \mathfrak{I}_{kl,i} \right)^2 \right]}$$

$$\mathfrak{I}_{kl,i} = I_{k,i} Q_{l,i} - I_{l,i} Q_{k,i}$$

$$\mathfrak{R}_{kl,i} = I_{k,i} I_{l,i} - Q_{k,i} Q_{l,i}$$

$$\Delta \varphi_{mess,ij} = \arctan \left[ \frac{\sum\limits_{i=1}^{M} \mathfrak{I}_{kl,i}}{\sum\limits_{i=1}^{M} \mathfrak{R}_{kl,i}} \right],$$

where
$V_{mess,k,i}$ is an antenna voltage of antenna k,
$I_{mess,k,i}$ is an inphase component of the antenna voltage of antenna k,
$Q_{mess,k,i}$ is a quadrature component of the antenna voltage of antenna k,
$P_{mess,k,i}$ is a power of the electronic signal without noise,
$P_{noise}$ is a noise power,
$\sigma_{ist}^2(\Delta \phi_{mess,kl})$ is the variance of the first variable,
$r_{mess,kl}$ is the first variable—a ratio of a reception power of the first signal and the second signal,
M is a number of the number of values of the first signal and the second signal taken into account,
i is an index of a number of values of the first signal and the second signal taken into account,
k is an index indicating the first signal,
l is an index indicating the second signal,
$P_{k,obs,n}$ is an observed power at antenna k,
$P_{l,obs,n}$ is an observed power at antenna l,
$\sigma_{ist}^2(\Delta \phi_{mess,kl})$ is the variance of the second variable,
$\Delta \phi_{mess,kl}$ is the second variable—a phase difference of the phase of the first signal and the phase of the second signal,
$I_{k,i}$ is an inphase component of the antenna voltage of antenna k,
$Q_{l,i}$ is a quadrature component of the antenna voltage of antenna l,
$I_{l,i}$ is an inphase component of the antenna voltage of antenna l,
$Q_{k,i}$ is a quadrature component of the antenna voltage of antenna k,
$\mathfrak{I}_{kl,i}$ is a first auxiliary variable, and
$\mathfrak{R}_{kl,i}$ is a second auxiliary variable.

6. The measuring device according to claim 1, wherein the measuring device further comprises:
a third antenna configured to receive the electromagnetic signal as a third signal; and wherein the one or more of the first variable and the second variable are derived from the first signal, the second signal and the third signal.

7. The measuring device according to claim 1, wherein the measuring device further comprises one or more of:
   a display configured to display a graphic reflecting a result of the determination of the presence or absence of the at least one systematic error of the electromagnetic signal; and
   an interface component configured to output information reflecting a result of the determination of the presence or absence of the at least one systematic error of the electromagnetic signal to an external device.

8. The measuring device according to claim 1, wherein the processor is further configured to determine, based on at least the first signal and the second signal, a direction of origin of the electromagnetic signal.

9. The measuring device according to claim 8, wherein the measuring device further comprises:
   a display configured to display an image reflecting the direction of origin of the electromagnetic signal, and an image reflecting a result of the determination of the presence or absence of the at least one systematic error of the electromagnetic signal.

10. The measuring device according to claim 9, wherein the display is configured display the direction of origin of the electromagnetic signal, only if the processor determines the absence of systematic errors in the electromagnetic signal.

11. A measuring method comprising:
    receiving, by a first antenna of a measuring device, a first signal;
    receiving, by a second antenna of a measuring device, a second signal;
    determining, by the measuring device, a first variable and a second variable based at least in part on the first signal and the second signal;
    determining, by the measuring device, a baseline variance of each of one or more of the first variable and the second variable;
    determining, by the measuring device, a variance of each of one or more of the first variable and the second variable; and
    determining, by the measuring device, a presence or absence of at least one systematic error of the received first signal and the received second signal based on the determined baseline variances of the first variable and the second variable and the determined variances of the first variable and the second variable; and
    wherein the first antenna receives an electromagnetic signal as the first signal, and the second antenna receives the electromagnetic signal as the second signal, and wherein the presence or absence of the at least one systematic error is determined with respect to the electromagnetic signal,
    wherein the method further comprises determining one or more of a first variance quotient by dividing the variance of the first variable by the baseline variance of the first variable, and a second variance quotient by dividing the variance of the second variable by the baseline variance of the second variable, and comparing each of the one or more first and second variance quotients with a respective variance threshold,
    wherein, when the comparison reveals that at least one of the first and second variance quotients is above the respective variance threshold, it is determined that at least one systematic error is present in the electromagnetic signal, and, when the comparison reveals that at least one of the first and second variance quotients is below the respective variance threshold, it is determined that no systematic errors are present in the electromagnetic signal, and
    wherein the first variable is a ratio of a power of a measuring point of the first signal and a power of a measuring point of the second signal simultaneous with the measuring point of the first signal, and wherein the second variable is a phase difference of the measuring point of the first signal and the measuring point of the second signal.

* * * * *